United States Patent
Ogawa

(10) Patent No.: US 7,308,283 B2
(45) Date of Patent: Dec. 11, 2007

(54) PORTABLE RADIO TERMINAL, ANTENNA SELECTOR CONTROL METHOD FOR USE IN PORTABLE RADIO TERMINAL, AND ANTENNA SELECTOR CONTROL PROGRAM

(75) Inventor: Ryutaro Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 11/169,767

(22) Filed: Jun. 30, 2005

(65) Prior Publication Data

US 2006/0003797 A1 Jan. 5, 2006

(30) Foreign Application Priority Data

Jul. 1, 2004 (JP) .............................. 2004-196023

(51) Int. Cl.
*H04M 1/00* (2006.01)
(52) U.S. Cl. ................ 455/550.1; 455/90.3; 455/91; 455/101; 455/78; 455/69; 455/522; 331/100; 330/10
(58) Field of Classification Search ............. 455/550.1, 455/90.3, 91, 101, 28, 68, 226.1, 115.1; 331/100; 342/324
See application file for complete search history.

(56) References Cited

U.S. PATENT DOCUMENTS 5,604,924 A * 2/1997 Yokoya ........................ 455/68
5,815,804 A * 9/1998 Newell et al. ................. 455/78
6,011,962 A * 1/2000 Lindenmeier et al. ... 455/226.1
6,236,841 B1 * 5/2001 Akiya ........................... 455/91
2002/0109555 A1 * 8/2002 Hwang ....................... 331/100
2002/0149517 A1 * 10/2002 Iguchi et al. ............... 342/374
2005/0064828 A1 * 3/2005 Kurakami et al. ........ 455/115.1
2005/0129068 A1 * 6/2005 Ginzburg et al. ........... 370/478
2005/0143024 A1 * 6/2005 Sung et al. ................. 455/101

FOREIGN PATENT DOCUMENTS

JP 5-175877 A 7/1993
JP 9-325059 A 12/1993

* cited by examiner

*Primary Examiner*—Joseph Feild
*Assistant Examiner*—David Q. Nguyen
(74) *Attorney, Agent, or Firm*—Sughrue Mion Pllc.

(57) ABSTRACT

An antenna selector selects one of the plurality of antennas according to an antenna selection signal. The antenna selector includes a voltage converter and an analog switch circuit. The voltage converter converts a power-supply voltage to a predetermined output voltage higher than the power-supply voltage. The analog switch circuit operates with the predetermined output voltage from the voltage converter or the power-supply voltage being applied thereto. A voltage converter controller controls the voltage converter to operate/halt according to a power level of the transmission signal generated by the transmitter. The predetermined output voltage is applied to the analog switch circuit when the voltage converter is operating and the power-supply voltage is applied to the analog switch circuit when the voltage converter is halted.

10 Claims, 9 Drawing Sheets

| TRANSMISSION POWER Pout | CONTROL SIGNAL "c" | VOLTAGE CONVERTER 62 |
|---|---|---|
| Pout ≧ A | H | OPERATE |
| Pout < A OR OFF | L | HALT |

PORTABLE RADIO TERMINAL, ANTENNA SELECTOR CONTROL METHOD FOR USE IN PORTABLE RADIO TERMINAL, AND ANTENNA SELECTOR CONTROL PROGRAM

BACKGROUND OF THE INVENTION

1. Field of the Invention

The present invention relates to a portable radio terminal, an antenna selector control method for use in the portable radio terminal, and an antenna selector control program. In particular, the present invention relates to a portable radio terminal in which a transmission signal is sent to an antenna through an analog switch circuit, an analog switch circuit control method for use in the portable radio terminal, and an analog switch circuit control program.

2. Description of the Related Art

Portable radio terminals include mobile phones conforming to PDC (Personal Digital Cellular), GSM (Global System for Mobile Communications), CDMA (Code Division Multiple Access), PHS (Personal Handy-phone System), etc., PDAs (Personal Digital Assistants) having a radio communication function, notebook personal computers having a radio communication function, and the like. With a portable radio terminal having only a single antenna, multipaths may be occurred depending on the environment where it is used, due to reflection, diffraction, or scattering of a radio wave caused by objects like geographical features and buildings. This may deteriorate the condition of signal transmission/reception of the portable radio terminal. Also, the positional relation between the antenna and the human body varies between when the user holds the portable radio terminal close to the head to have a talk and when the user removes the portable radio terminal from his or her head to see its display, resulting in variation of the radio wave transmission/reception condition. Even when the radio wave transmission/reception condition is good in one situation, the condition may deteriorate in other situations. The signal transmission/reception condition of the portable radio terminal may thus deteriorate. Also, with a folding-type portable radio terminal, the positional relation between the terminal body and the antenna varies when the terminal is folded or opened, which also influenced the radio wave transmission/reception condition. Even when the radio wave transmission/reception condition is good in one situation, the condition may deteriorate in the other situation. The signal transmission/reception condition of the portable radio terminal may thus deteriorate.

For the reasons above, recent portable radio terminals are often provided with two or more antennas. Such a portable radio terminal selects and uses one of the antennas that is offering a good transmission/reception condition. Such a portable radio terminal has two or more transmission signal paths from the radio section to these antennas, and switches the paths using an antenna switch.

A portable radio terminal having such an antenna switch requires that the signal be inputted in such a range that the IMD characteristic of the analog switch circuit does not deteriorate. This imposes restrictions on design.

JP Laid-Open patent No. 5-175877A discloses a time division multiplexing transceiver circuit that switches impedance between transmission and reception. In a high-frequency signal switching device described in the prior art, a voltage from a voltage converter is applied to both ends of a variable-capacitance diode through transmission lines. The voltage converter is supplied with power from a power supply and the output voltage from the voltage converter is controlled by a CPU (Central Processing Unit). The impedance is controlled by the voltage value applied to the variable-capacitance diode.

JP Laid-open patent No. 9-325059A discloses an ultrasonic current meter for measuring the velocity of a fluid. A power-supply control circuit of the described ultrasonic current meter causes a voltage converter circuit to operate to accumulate power in a capacitive element until an ultrasonic wave transmission start signal is inputted, and the power-supply control circuit halts the operation of the voltage converter circuit when the transmission start signal is inputted from a controller. Thus, in this ultrasonic current meter, the power-supply control circuit halts the operation of the voltage converter circuit when a reception circuit makes a reception judgment, and so no noise nor ripple is generated by the voltage converter circuit when the reception timing is determined. This reduces measuring errors and enhances precision.

SUMMARY OF THE INVENTION

An object of the present invention is to provide improved control method of switching, of an antenna switch in a portable radio terminal having two or more antennas.

Another object of the present invention is to improve IMD characteristics of an analog switch circuit in an antenna switch of a portable radio terminal having two or more antennas.

Still another object of the invention is to reduce the restriction in designing a portable radio terminal by improving the IMD characteristics of an analog switch circuit.

A further object of the invention is to improve the IMD characteristics of a portable radio terminal while reducing its power consumption.

A further object of the invention is to provide a portable radio terminal in which a current is consumed according to the power of a transmission signal T and the consumed current is reduced when the power of the transmission signal T is low.

According to a configuration of the present invention, a voltage converter controller controls a voltage converter to cause it to operate/halt on the basis of the power level of a transmission signal generated by a transmitter. A predetermined output voltage is applied to an analog switch circuit when the voltage converter is operating, and a power-supply voltage is applied to the analog switch circuit when the voltage converter is halted. This procedure reduces current consumption in the analog switch circuit. Reducing the current consumption lengthens the time during which the portable radio terminal operates. The voltage converter controller provides control so that the voltage converter operates and the predetermined output voltage is applied to the analog switch circuit when the power of the transmission signal generated by the transmitter is equal to or greater than a predetermined threshold, and so that the voltage converter halts and the power-supply voltage is applied to the analog switch circuit in place of the predetermined output voltage when the power of the transmission signal is smaller than the threshold, which reduces the current consumption in the analog switch circuit and lengthens the operating time of the portable radio terminal.

Also, the voltage converter controller may variably control the output voltage from the voltage converter on the basis of the transmission power value of the transmission signal generated by the transmitter, which further reduces the current consumption in the analog switch circuit and lengthens the operating time of the portable radio terminal.

DETAILED DESCRIPTION OF THE PREFERRED EMBODIMENTS

As described earlier, a portable radio terminal having two or more antennas selects one of the antennas using an antenna switch. The antenna switch may be realized with a structural switch using relay elements etc. The antenna switch may also be realized with an electric switch using analog switch circuits.

However, the IMD (Inter Modulation Distortion) characteristic of an analog switch circuit deteriorates when a transmission signal with high power is inputted to the analog switch circuit. This property is based on physical properties of transistors forming the analog switch circuit. Deterioration of the IMD characteristic causes distortion in the transmission signal and deteriorates the quality of radio communication.

In order for increasing transmission signal power inputted to the analog switch circuits while suppressing the IMD characteristics deterioration, we can apply a higher voltage to the analog switch circuits. This method utilizes the property that application of a higher voltage increases the linearity of the analog switch circuits. The IMD characteristics of the analog switch circuits are improved as a result.

Figure 1:
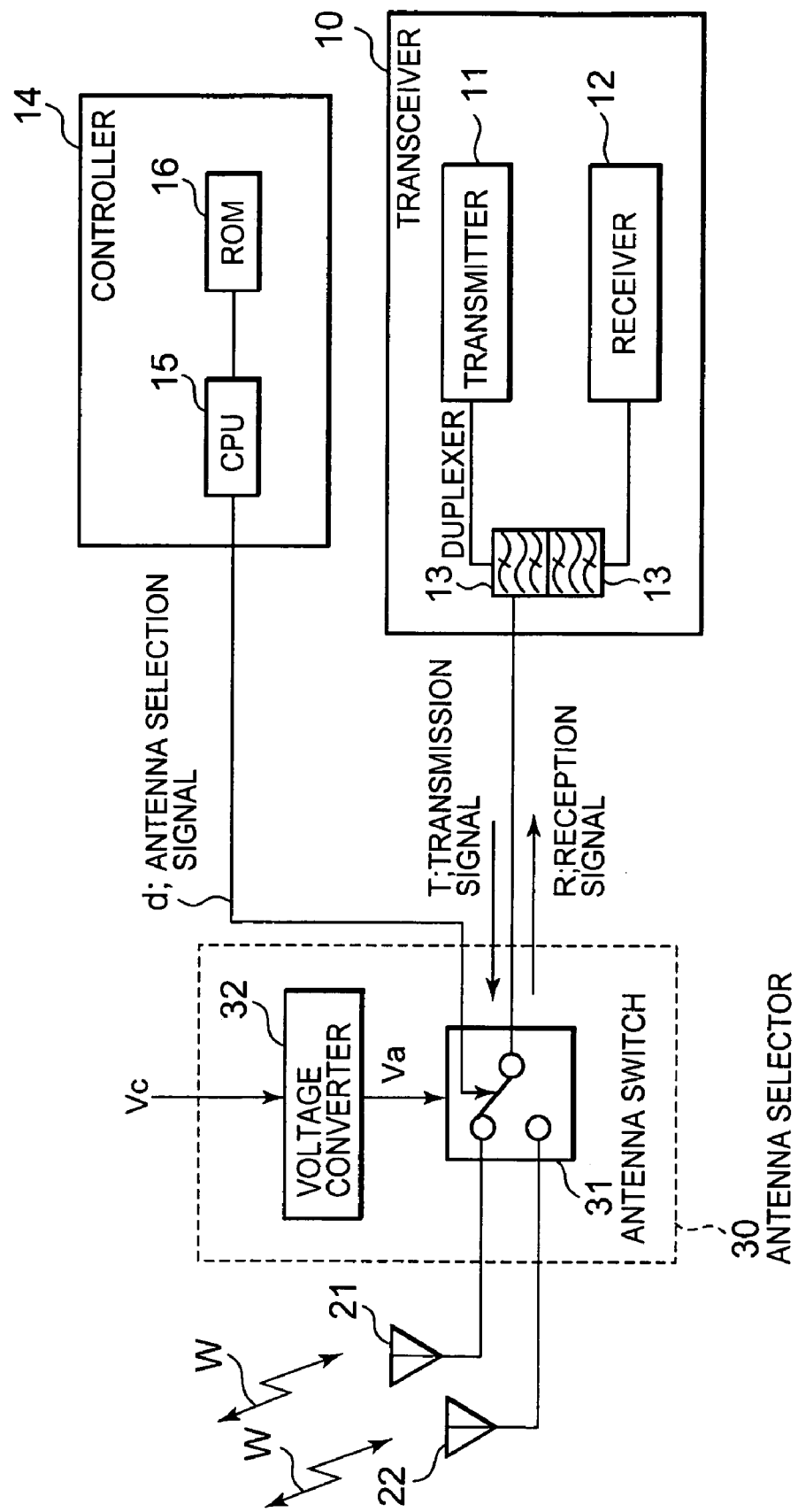
FIG. 1 is a block diagram illustrating the electric configuration of a portable radio terminal with improved IMD characteristics.

FIG. 1 illustrates a configuration of a portable radio terminal with improved IMD characteristics. Though FIG. 1 does not show components not directly related to the invention, the portable radio terminal actually has other components such as a display, manipulation section, etc. The portable radio terminal includes a transceiver 10, antennas 21 and 22, and an antenna selector 30. The transceiver 10 includes a transmitter 11, a receiver 12, a duplexer 13, and a controller 14. The transmitter 11 generates a transmission signal T to be sent to a base station. The receiver 12 receives a reception signal R from the base station. The duplexer 13 isolates the transmission signal T and the reception signal R so that they would not interfere with each other.

The controller 14 includes a CPU 15 for controlling the entire portable radio terminal, and a ROM (Read Only Memory) 16 storing various programs for operations of the CPU 15. The controller 14 outputs an antenna selection signal "d" according to a predetermined program. The antenna selection signal "d" is connected to the antenna selector 30. The controller 14 controls an antenna switch 31 using the antenna selection signal "d".

The antenna selector 30 includes the antenna switch 31 and a voltage converter 32. The voltage converter 32 is formed of a boost DC-DC converter, for example. The voltage converter 32 converts a power-supply voltage Vc supplied from a battery (not shown), into a given output voltage Va that is set so that the IMD characteristic deterioration is within a predetermined permissible range even when the power of the transmission signal T is high, and the output voltage Va is supplied to the antenna switch 31. The antenna switch 31 receives the output voltage Va from the voltage converter 32. The antenna switch 31 connects the transceiver 10 and the antenna 21 or the antenna 22 on the basis of the antenna selection signal "d". When connected with the transceiver 10 through the antenna selector 30, the antenna 21 or 22 radiates a radio wave W corresponding to the transmission signal T or receives a radio wave W, whereby the radio wave W is sent to or received from a radio base station. (not shown) The antennas 21 and 22 are used for both transmission and reception.

Figure 2:
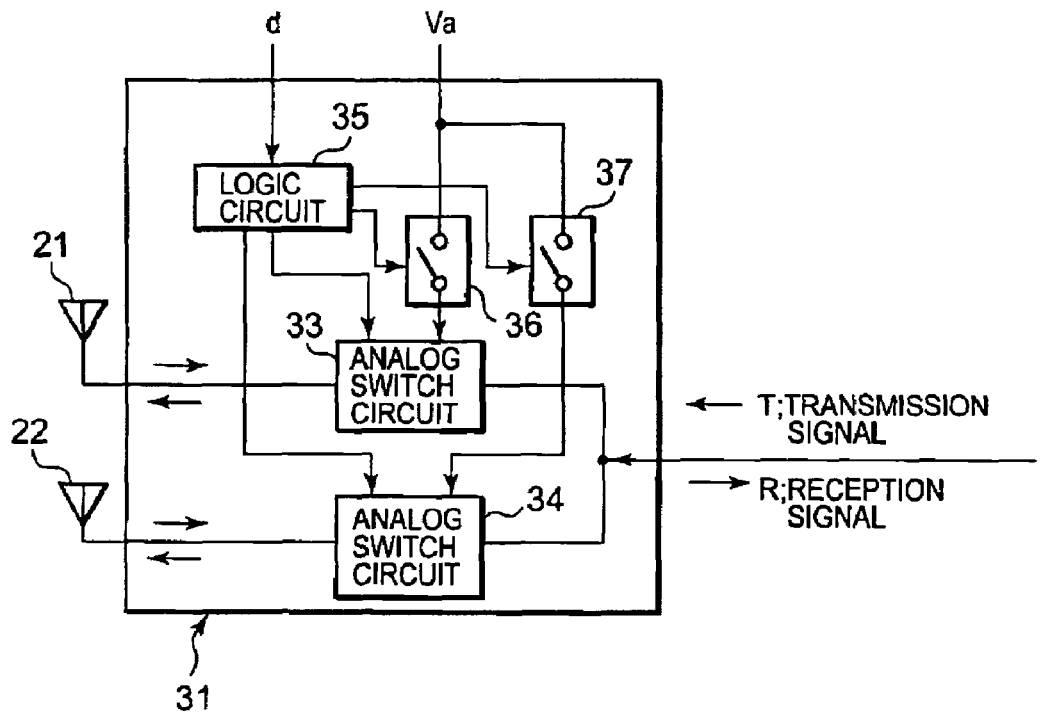
FIG. 2 is a diagram illustrating the electric configuration of a major portion of the antenna switch 31 shown in FIG. 1.

FIG. 2 is a diagram illustrating the electric configuration of a major part of the antenna switch 31 of FIG. 1.

As shown in FIG. 2, the antenna switch 31 includes analog switch circuits 33 and 34, a logic circuit 35, and switches 36 and 37. The logic circuit 35 controls the switching of the analog switch circuits 33 and 34 and the switches 36 and 37 on the basis of the antenna selection signal "d". The analog switch circuits 33 and 34 operate when supplied with the output voltage Va from the voltage converter 32. The analog switch circuits 33 and 34 switch on/off on the basis of an input from the logic circuit 35. The analog switch circuits 33 and 34 are supplied with power from outside. When switched on, the analog switch circuit 33 or 34 receives the transmission signal T and outputs the transmission signal to the selected one of the antennas 21 and 22. On the other hand, during reception, the analog switch circuit 33 or 34 receives the reception signal R from the antenna 21 or 22 and outputs the reception signal R to the transceiver 10. The switches 36 and 37 turn on/off on the basis of an input from the logic circuit 35. When the switch 36 turns off, the output voltage Va from the voltage converter 32 is not supplied to the analog switch circuit 33. Then, the analog switch circuit 33 halts its operation. On the other hand, when the switch 36 turns on, the output voltage Va from the voltage converter 32 is supplied to the analog switch circuit 33. Then, the analog switch circuit 33 starts operating. The switch 37 and the analog switch circuit 34 are correlated with each other in the same way.

With this control, the analog switch circuits are turned off when not used, resulting in reduced power consumption.

In this portable radio terminal, the power-supply voltage Vc is converted to the output voltage Va in the voltage converter 32. The output voltage Va is then constantly supplied to the antenna switch 31. The analog switch circuits 33 and 34 and the switches 36 and 37 are controlled on the basis of the antenna selection signal "d". The output voltage Va is applied to the analog switch circuit 33 or the analog switch circuit 34 through the switch 36 or 37. During signal transmission, the transmitter 11 generates the transmission signal T. The transmission signal T passes through the duplexer 13 and a selected one of the analog switch circuits 33 and 34 to the antenna 21 or the antenna 22. On the other hand, during signal reception, the reception signal R is received at the receiver 12 from the selected antenna 21 or 22 and through the one of the analog switch circuits and the duplexer 13.

Figure 3:
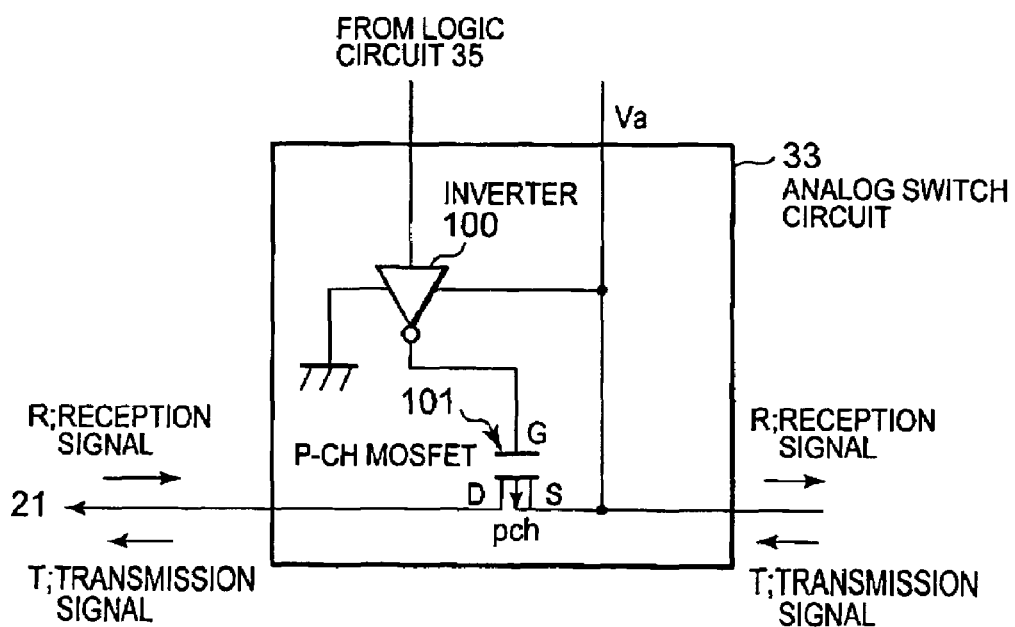
FIG. 3 is a diagram illustrating the electric configuration of an analog switch circuit shown in FIG. 2.

FIG. 3 is a diagram illustrating the configuration of the analog switch circuit 33. The analog switch circuit 34 is constructed similarly.

The analog switch circuit 33 includes an inverter 100 and a P-channel MOSFET 101. The inverter 100 is connected to the gate of the FET 101. The voltage Va is applied to the power supply of the inverter 100 and to the source of the FET 101 from the outside of the analog switch circuit 33.

The operation of the analog switch circuit 33 will be described hereinafter. When the inverter 100 outputs "H" on the basis of an output from the logic circuit 35, the source-gate voltage of the FET 101 decreases and the switch is turned off. On the other hand, when the inverter 100 outputs "L", the source-gate voltage of the FET 101 increases and the switch is turned on. Preferably, a capacitor (not shown) is inserted between the analog switch circuit 33 and the antenna. This prevents the DC voltage from varying even when the user of the portable radio terminal touches the antenna, and so the circuit operates normally.

In the portable radio terminal described above, the voltage Va, which is higher than the power-supply voltage Vc of the battery, is applied to the analog switch circuits 33 and 34, whereby the IMD characteristic is improved as compared with related-art portable radio terminals.

In the portable radio terminal above, while the antenna selector 30 includes the voltage converter 32 that converts the power-supply voltage Vc to the output voltage Va, the state of operation of the voltage converter 32 cannot be controlled by the controller 14. That is, the output voltage Va adapted for the high-power transmission signal T is always supplied to the antenna switch 31 and applied to the analog switch circuit 33 or the analog switch circuit 34. Therefore, a current corresponding to the output voltage Va flows to the analog switch circuit 33 or the analog switch circuit 34 even when the power of the transmission signal T is low and the IMD characteristic deterioration is small, resulting in increased current consumption. This reduces the life of the battery and shortens the time during which the portable radio terminal operates.

Figure 4:
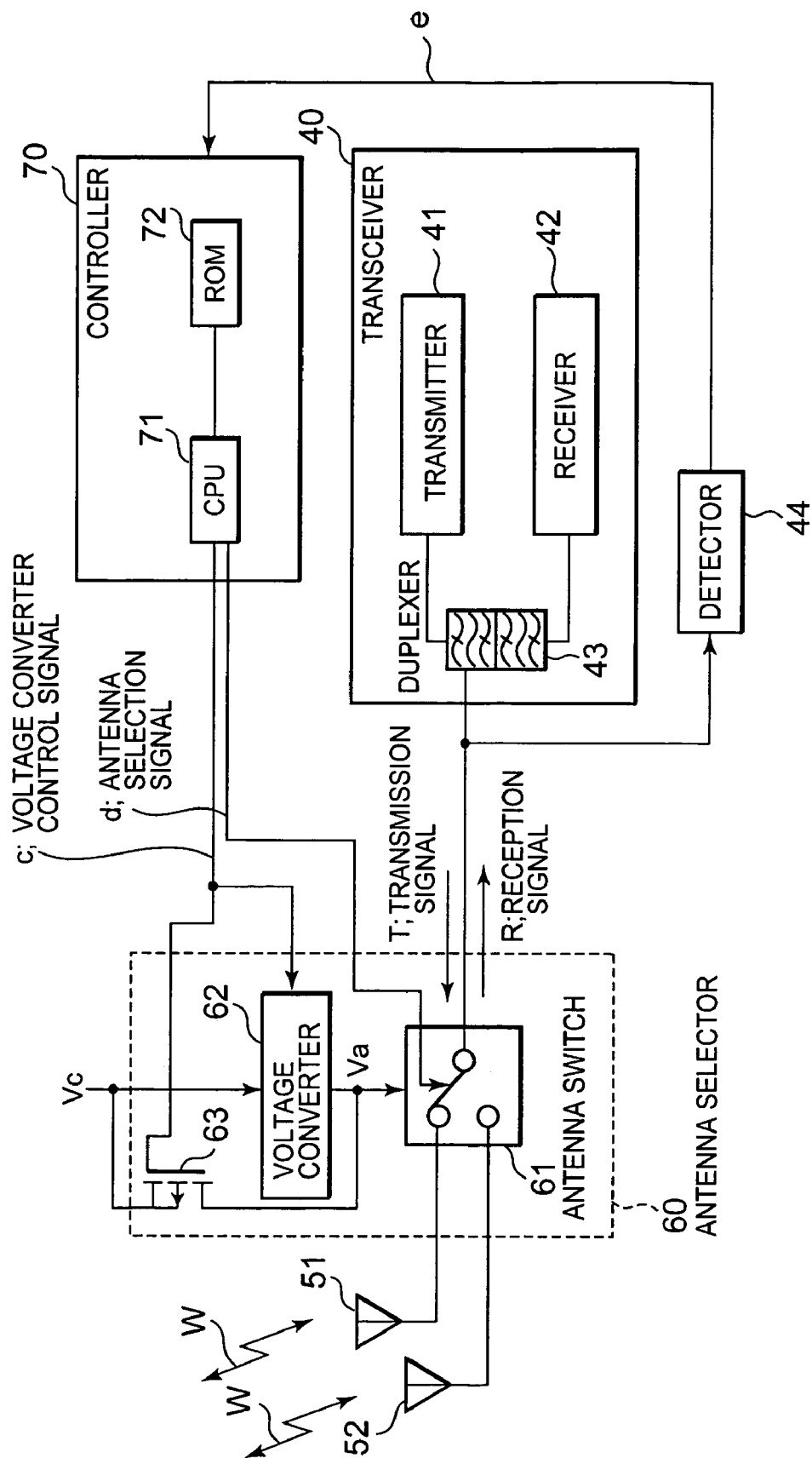
FIG. 4 is a block diagram illustrating the electric configuration of a portable radio terminal according to a first embodiment of the present invention.

FIG. 4 is a block diagram illustrating the electric configuration of a portable radio terminal according to a first embodiment of the present invention.

As shown in FIG. 4, the portable radio terminal of the embodiment includes a transceiver 40, a detector 44, antennas 51 and 52, an antenna selector 60, and a controller 70. The transceiver 40 includes a transmitter 41, a receiver 42, and a duplexer 43. The transmitter 41 generates a transmission signal T during transmission operation. The receiver 42 receives a reception signal R. The duplexer 43 isolates the transmission signal T and the reception signal R so that they do not interfere with each other. The detector 44, which is formed of a diode for detection, an LPF (Low Pass Filter), etc., detects the transmission signal T and outputs a detection signal "e". The detection signal contains information about the power of the transmission signal T.

The antenna selector 60 includes an antenna switch 61, a voltage converter 62, and a semiconductor switch 63. The voltage converter 62 is formed of a boost DC-DC converter, for example. The state of operation of the voltage converter 62 is controlled on the basis of a voltage converter control signal "c" from the controller 70. The voltage converter 62 converts a power-supply voltage Vc supplied from a battery (not shown) into a given output voltage Va higher than the power-supply voltage Vc, and the output voltage Va is applied to the antenna switch 61. The value of the output voltage Va is adapted for high-power transmission signal T and is previously set at such a level that the antenna switch 61 provides a good IMD characteristic. The semiconductor switch 63, which is formed of, e.g., an enhancement-type p-channel MOSFET, is on/off-controlled on the basis of the voltage converter control signal "c", and applies the power-supply voltage Vc to the antenna switch 61 when it is on. Particularly, in this embodiment, the semiconductor switch 63 is off when the voltage converter 62 is operating and is on when the voltage converter 62 is halted. The voltage converter 62 is constructed so that the output side comes in a high impedance state during a halt.

The antenna switch 61 is constructed similarly to that of the related art of FIG. 2. The antenna switch 61 includes analog switch circuits that receive the transmission signal T and send it out to the selected one of the antenna 51 and antenna 52. Particularly, in this embodiment, the antenna switch circuit 61 is supplied with the power-supply voltage Vc through the semiconductor switch 63 or with the output voltage Va from the voltage converter 62. The transceiver 40 is connected with the antenna 51 or the antenna 52 on the basis of the antenna selection signal "d".

The controller 70 has a CPU (Central Processing Unit) 71 for controlling the portable radio terminal and a ROM (Read Only Memory) 72 recording a voltage converter control program for operations of the CPU 71. The controller 70 controls the voltage converter 62 to cause it to operate/halt on the basis of the detection signal "e" of the transmission signal T generated by the transmitter 41. Particularly, in this embodiment, the controller 70 always monitors the transmission power value of the transmission signal T on the basis of the detection signal "e". When the transmission power value is equal to or greater than a predetermined threshold, the controller 70 outputs the voltage converter control signal "c" for causing the voltage converter 62 to operate, and when the transmission power value is smaller than the threshold, the controller 70 outputs the voltage converter control signal "c" for causing the voltage converter 62 to halt.

Figures 5, 6:
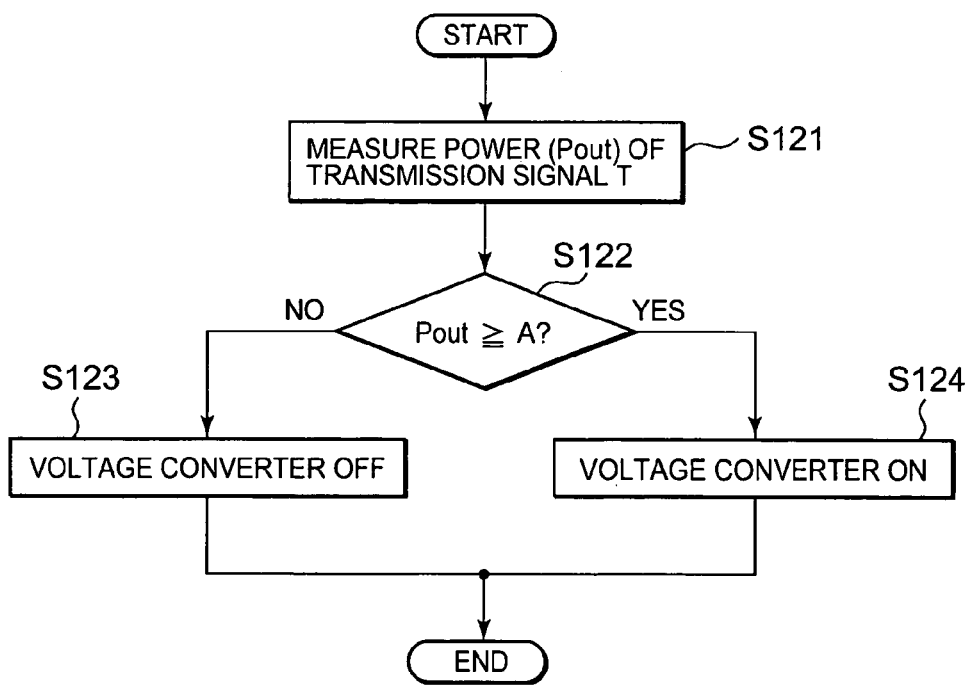
FIG. 5 is a diagram showing a control table indicating states of control applied from a controller 70 to a voltage converter 62.
FIG. 6 is a flow chart showing a control flow in the portable radio terminal of the first embodiment.

FIG. 5 is a diagram showing a control table indicating states of control applied from the controller 70 to the voltage converter 62.

The control table will be described hereinafter. The left-hand column indicates the classification of control states based on the power of the transmission signal T. When the power Pout of the transmission signal T is equal to or greater than a predetermined threshold A, the voltage converter control signal "c" is "H". In this case, the voltage converter 62 starts operating and the output voltage Va is applied to the antenna switch 61.

Next, when the power Pout of the transmission signal T is smaller than the predetermined threshold A, the voltage converter control signal "c" is "L". In this case, the voltage converter 62 halts its operation and the power-supply voltage Vc is applied to the antenna switch 61 in place of the voltage Va.

FIG. 6 is a flow chart showing a control flow performed by the controller 70. Referring to FIG. 6, the method of controlling voltage converter operation in the portable radio terminal of the embodiment will be described hereinafter.

The controller 70 measures the present transmission power Pout on the basis of the detection signal "e" received from the detector 44 (S121). Next, the transmission power Pout is compared with the threshold A (S122). When the transmission power Pout of the transmission signal T is smaller than the threshold A, the controller 70 halts the operation of the voltage converter 62 (S123). Specifically, as shown in FIG. 5, the controller 70 outputs the voltage converter control signal "c" at a low level ("L") to halt the operation of the voltage converter 62. The voltage converter 62 receives the voltage converter control signal "c" and halts its operation. At this time, the voltage converter control signal "c" turns on the semiconductor switch 63 and so the power-supply voltage Vc is applied to the antenna switch 61. The consumed current is thus decreased to a level lower than that when the output voltage Va from the voltage converter 62 is applied to the antenna switch 61.

When the transmission power Pout exceeds the threshold, the controller 70 causes the voltage converter 62 to operate (S124). Specifically, as shown in FIG. 5, the controller 70 outputs the voltage converter control signal "c" at a high level ("H") to cause the voltage converter 62 to operate. The voltage converter 62 receives the voltage converter control signal "c" and comes in an operating state. Also, the semiconductor switch 63 turns off and the output voltage Va from the voltage converter 62 is applied to the antenna switch 61. This improves the IMD characteristics of the analog switch circuits in the antenna switch 61. These operations are performed in the same way regardless of which antenna of the antennas 51 and 52 is selected by the antenna switch 61. The series of control steps shown in FIG. 6 is repeatedly carried out.

Figure 7:
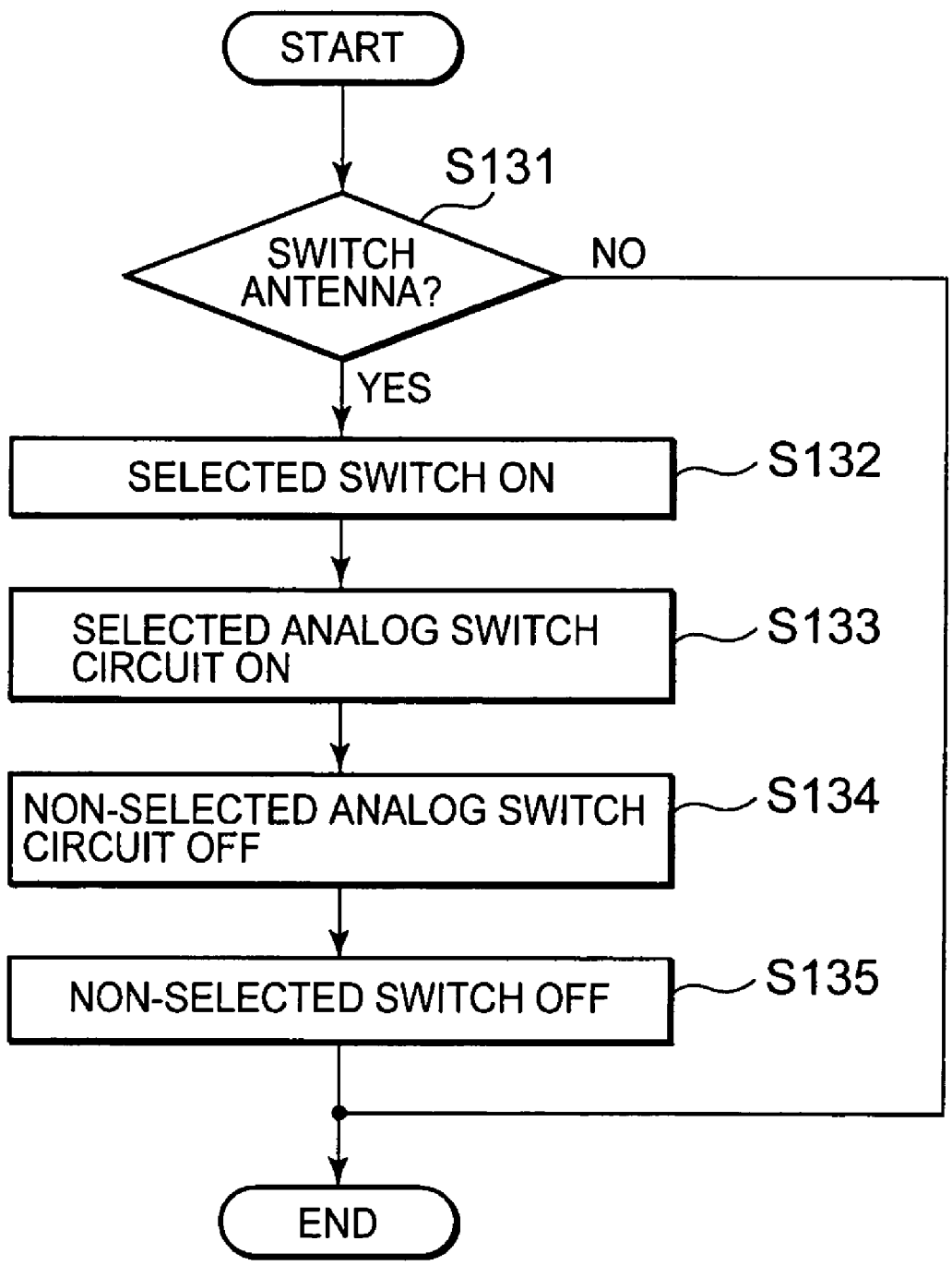
FIG. 7 is a flow chart showing a control flow in the portable radio terminal of the first embodiment.

FIG. 7 is a flow chart showing a control flow that the controller 70 performs to switch from one antenna to the other. The switching of antennas is instructed by a control program running on the controller 70. The antenna switching operation may be triggered by various events. For example, the trigger can be, a deterioration in radio wave condition, a variation of operation state of the portable radio terminal, or a state variation of a foldable mobile phone, i.e., when it is folded or opened.

Whether the controller 70 switches antennas is decided on the basis of data stored in a particular register in the CPU 71 in the controller 70, for example. The antenna switching control program running on the controller 70 checks the data contents of the register on a regular basis or when triggered by a variation of the register value. The controller 70 then decides whether to switch antennas.

The operation will be described with reference to FIG. 7. The controller 70 judges whether to switch antennas as described above (S131). When there is no need to switch antennas, the operation is directly terminated. On the other hand, when a decision is made to switch antennas, the operation moves to the next step. The operation will be described below assuming that the antenna 21 is switched to the antenna 22.

The controller 70 instructs the logic circuit 35 with the antenna selection signal "d" to turn on the selected switch, i.e., the switch 37 (S132). The logic circuit 35 turns on the switch 37 according to the instruction. The switch 37 is thus turned on and so Va is applied to the analog switch circuit 34 and the operation starts.

Next, the controller 70 instructs the logic circuit 35 with the antenna selection signal "d" to turn on the selected analog switch circuit, i.e., the analog switch circuit 34 (S133) The logic circuit 35 turns on the analog switch circuit 34 as instructed. The analog switch circuit 34 is thus turned on and so the transmitter 41 and the antenna 22 are connected.

Next, the controller 70 instructs the logic circuit 35 with the antenna selection signal "d" to turn off the non-selected analog switch circuit, i.e., the analog switch circuit 33 (S134). The logic circuit 35 turns off the analog switch circuit 33 as instructed. The analog switch circuit 33 is thus turned off and so the transmitter 41 and the antenna 21 are disconnected.

Next, the controller 70 instructs the logic circuit 35 with the antenna selection signal "d" to turn off the non-selected switch, i.e., the switch 36 (S135). The logic circuit 35 then turns off the switch 36 as instructed. The switch 36 is thus turned off, so Va is not applied to the analog switch circuit 33 and the operation halts.

While FIG. 7 has described the switching from the antenna 21 to the antenna 22, similar operations are carried out to switch from the antenna 22 to the antenna 21.

The control process shown in FIG. 7 completely avoids cutting off the transmission signal T at any moment. This prevents the transmission signal T from being momentarily cut off from the portable radio terminal and allows the portable radio terminal to maintain a satisfactory communication quality. Also, the power consumption of the portable radio terminal is reduced because the power-supply voltage is not applied to the analog switch circuit in vain.

While, in the control process shown in FIG. 7, the controller 70 instructs the logic circuit 35 to perform individual control steps, other methods are also possible. For example, the controller 70 may output to the logic circuit 35 a particular instruction about the switching of antennas so that the logic circuit 35 performs process steps corresponding to S132 to S135 without being repeatedly instructed by the controller 70. Preferably, the controller 70 performs the control of FIG. 6 and the control of FIG. 7 regularly and repeatedly.

As described so far, according to the first embodiment, the operation of the voltage converter 62 is halted when the transmission power Pout is smaller than the threshold A. Then, the power-supply voltage Vc is applied to the antenna switch 61 through the semiconductor switch 63, so the current consumption in the antenna switch 61 is reduced. This lengthens the battery life and lengthens the operating time of the portable radio terminal.

In the first embodiment, the voltage converter 62 is controlled into only two states, i.e., operating and halted under control, on the basis of a comparison between the transmission power Pout and the threshold A. Accordingly, while the transmission power Pout may successively vary, the operation of the voltage converter 62 is limited only to the two states. That is, only the two kinds of voltages, Va and Vc, can be applied to the antenna switch 61. Therefore, the voltage applied to the antenna switch 61 may not always be most suitable for the transmission power Pout. The current consumption can be further reduced by more accurately controlling the voltage applied to the antenna switch 61 according to variations of the transmission power Pout. A second embodiment below improves this point.

Figure 8:
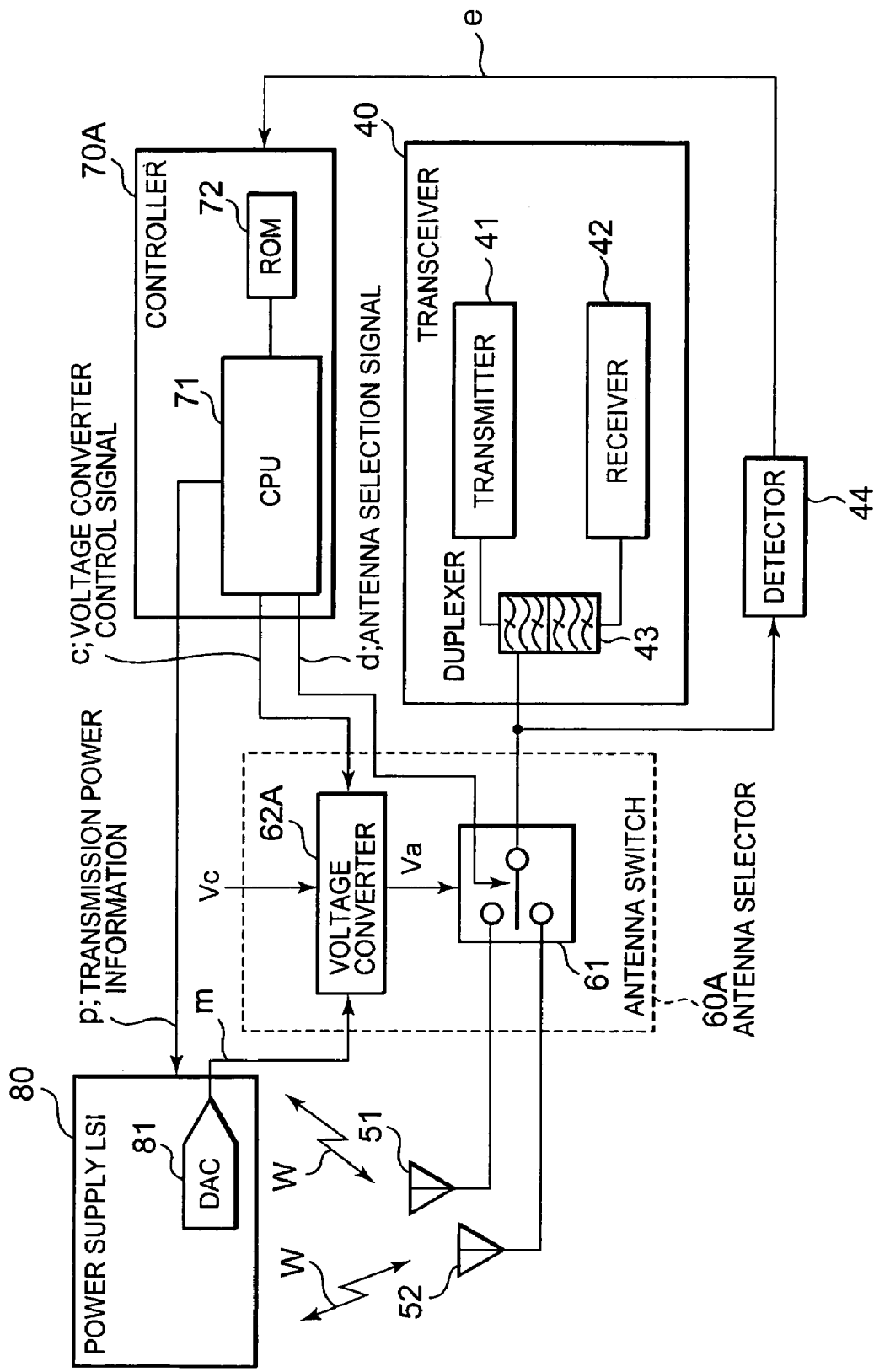
FIG. 8 is a block diagram illustrating the electric configuration of a portable radio terminal according to a second embodiment of the present invention.

FIG. 8 is a block diagram illustrating the electric configuration of a portable radio terminal according to the second embodiment of the present invention, where the same reference characters are assigned to the same elements as those shown in FIG. 4 in the first embodiment.

In this portable radio terminal, the antenna selector 60 and the controller 70 shown in FIG. 4 are replaced by an antenna selector 60A and a controller 70A having new functions. The portable radio terminal further includes a power supply LSI (Large-Scale Integrated circuit) 80. In the antenna selector 60A, the voltage converter 62 of FIG. 4 is replaced by a voltage converter 62A having a different configuration, and the semiconductor switch 63 is removed. In addition to the functions of the voltage converter 62, the voltage converter 62A provides an output voltage Va that is variably controlled by a reference signal "m" sent by the power supply LSI 80. Therefore, the output voltage from the voltage converter 62A is capable of varying continuously.

Also, in addition to the functions of the controller 70, the controller 70A generates transmission power information p that corresponds to the transmission power value of the transmission signal T on the basis of the level of the detection signal "e". The power supply LSI 80 has a DAC (Digital-to-Analog Converter) 81. The DAC 81 converts the transmission power information p in digital form into the reference signal "m" in analog form. The controller 70A thus cooperates with the power supply LSI 80 to variably control the output voltage Va from the voltage converter 62A in accordance with the transmission power value of the transmission signal T. In other respects, the configuration is the same as that shown in FIG. 4.

Figure 9:
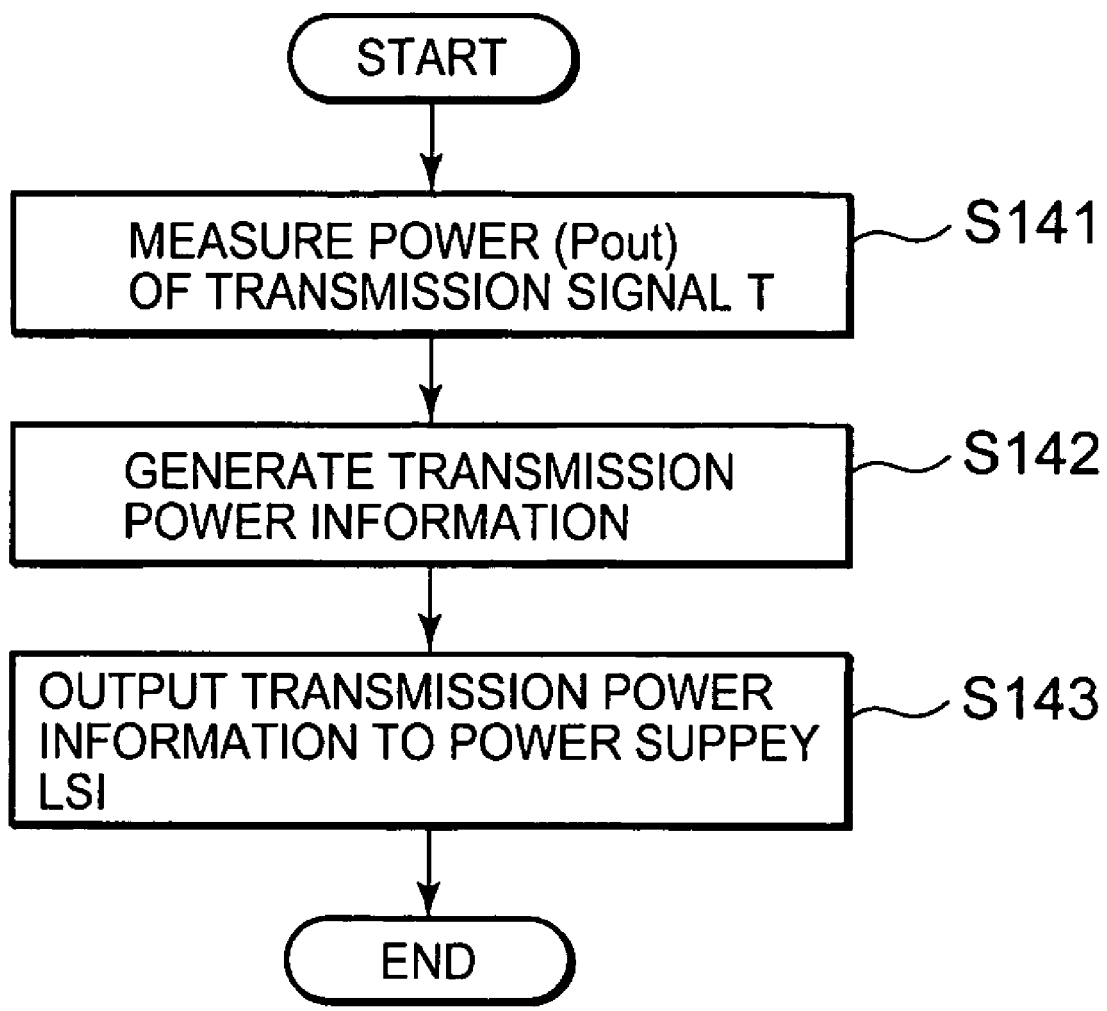
FIG. 9 is a flow chart showing a control flow in the portable radio terminal according, to the second embodiment.

FIG. 9 is a flow chart showing a control flow performed by the controller 70A of the second embodiment. The control flow will be described referring to the diagram.

First, the controller 70A measures the transmission power of the transmission signal T on the basis of the detection signal "e" received from the detector (S141). Next, the controller 70A generates the transmission power information p corresponding to the transmission power (S142). The transmission power information p has a digital value. Next, the controller 70A outputs the transmission power information p to the power supply LSI 80 through a signal line (S143).

The power supply LSI 80 sets the output of the DAC 81 on the basis of the transmission power information p. In order to allow the antenna switch 61 to maintain satisfactory IMD characteristics, the power supply LSI 80 sets the output value of the DAC 81 so that the voltage converter 62 outputs a greater voltage when the transmission power is larger. The DAC 81 outputs the reference signal "m". The voltage converter circuit 62A variably controls the output voltage Va on the basis of the reference signal "m". This configuration makes it possible to, more accurately, control the output voltage from the voltage converter 62A on the basis of the power of the transmission signal T. This further reduces the current consumption in the antenna switch 61, further lengthens the battery's life, and lengthens the operating time of the portable radio terminal. The output voltage of the voltage converter 62A can be controlled more finely by increasing the number of bits of the DAC 81.

The controller 70A may switch antennas by process steps as shown in FIG. 7.

Figure 10:
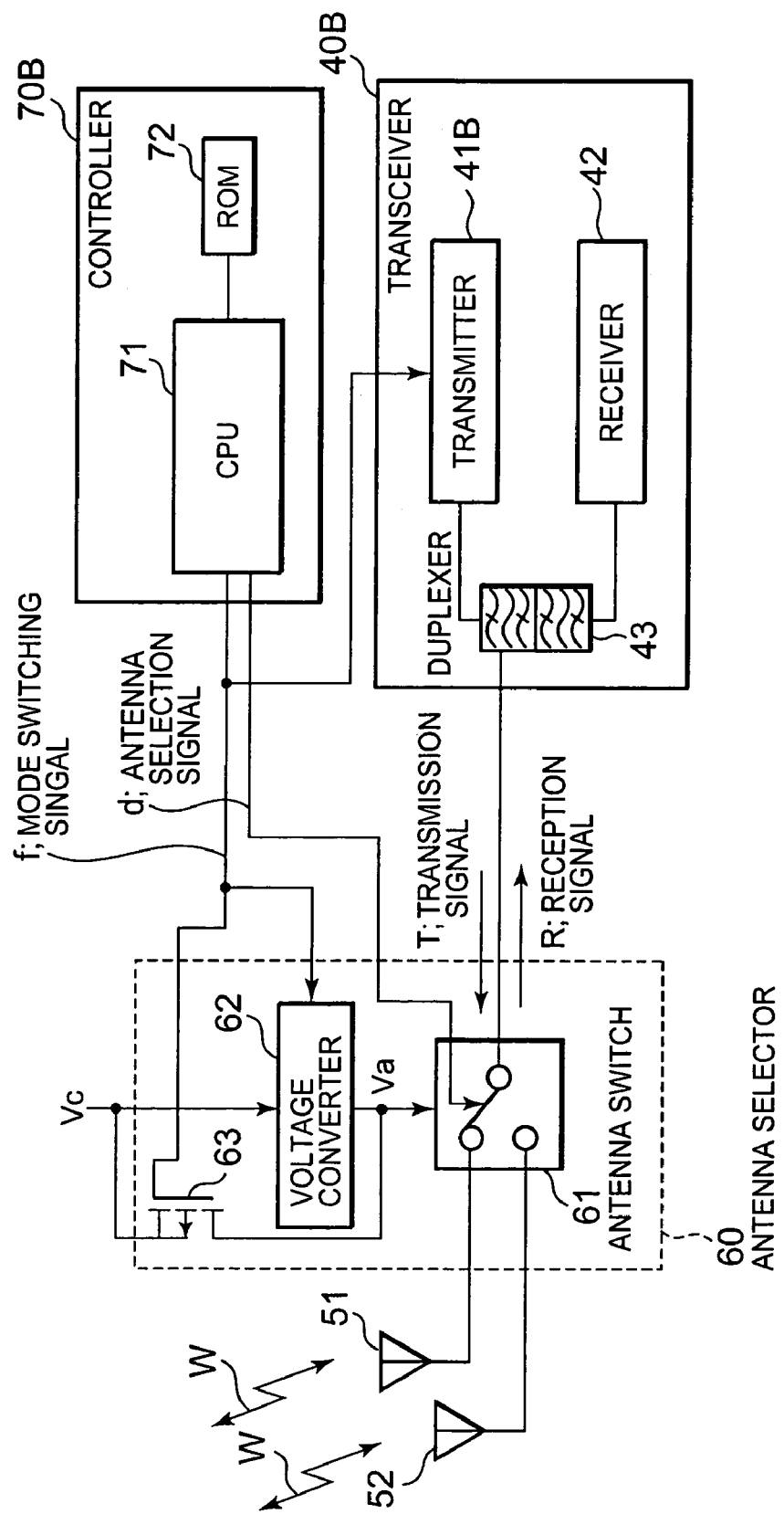
FIG. 10 is a block diagram illustrating the electric configuration of a portable radio terminal according to a third embodiment of the present invention.

FIG. 10 is a block diagram illustrating the electric configuration of a portable radio terminal according to a third embodiment of the present invention, where the same reference characters are assigned to the same elements as those shown in FIG. 4.

Unlike the portable radio terminal of FIG. 4, this portable radio terminal has no detector 44. Also, the transceiver 40 and the controller 70 of FIG. 4 are replaced by a transceiver 40B and a controller 70B having different configurations. In the transceiver 40B, the transmitter 41 is replaced by a transmitter 41B having a new function. In addition to the functions of the transmitter 41, the transmitter 41B is capable of switching between a normal mode operation and a low power mode operation on the basis of a mode switching signal f from the controller 70B. In a normal mode operation, the transmission power value of the transmission signal T is outputted at a certain fixed value equal to or higher than a given reference value. On the other hand, in a low power mode operation, the transmission power value is outputted at a certain fixed value smaller than the reference value. A plurality of fixed values may be used. The transmission power values of the output signals in the individual operation modes are previously stored in a ROM 72, according to which values the controller 70B controls the transmission power of the transmission signal from the transmitter 41B. The controller 70B thus outputs the mode switching signal f, while the controller 70 of FIG. 4 outputs the voltage converter control signal "c". In other respects, the configuration is the same as that of FIG. 4.

The controller 70B generates the mode switching signal f according to a predetermined control program. The control program is previously stored in the ROM 72 and runs on the controller 70B. Unlike that of the portable radio terminal of FIG. 4, the controller 70B does not provide control based on the detection signal "e" from the detector 44.

Figure 11:
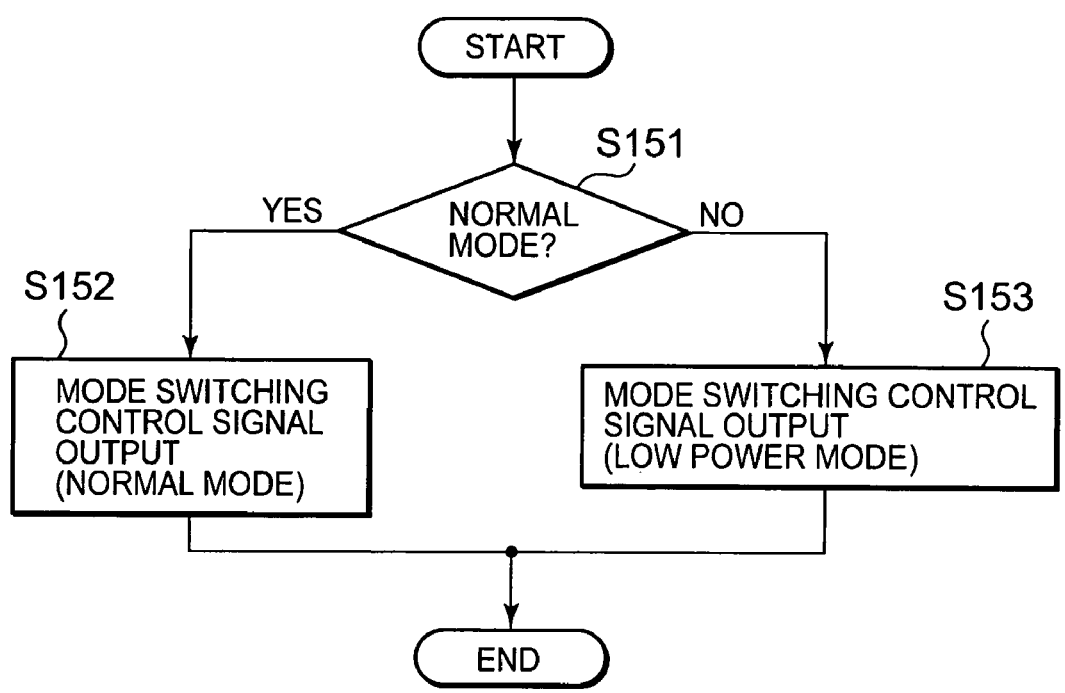
FIG. 11 is a flow chart showing a control flow in the portable radio terminal of the third embodiment.

FIG. 11 is a flow chart illustrating a control flow performed by the controller 70B of the third embodiment. The operation will be described referring to the diagram.

The controller 70B checks the operation mode (S151). Specifically, for example, an area for judging the present operation mode is ensured in a particular register in the CPU 71, and the controller 70B checks the register. For example, "1" stored in the register indicates the normal mode and "0" indicates the low power mode.

Next, when the present operation mode is the normal mode, the controller 70B outputs a control signal for switching to the normal mode (S152). Specifically, the controller 70B outputs the mode switching signal at "H" (a high-level voltage).

On the other hand, when the present operation mode is the low power mode, the controller 70B outputs a control signal for switching to the low power mode (S153). Specifically, the controller 70B outputs the mode switching signal at "L" (a low-level voltage). The series of control steps shown in FIG. 11 is repeatedly carried out.

The controller 70B may perform similar operations as shown in FIG. 7 to switch antennas. Also, the operation mode of the portable radio terminal may be determined according to another control program. For example, the control program may set the switching of operation modes on the basis of a control signal from a base station. Then, as described earlier, the controller 70B rewrites the value of the particular register in the CPU 71, for example.

The operation state of the voltage converter 62 in the antenna selector 60 is controlled on the basis of the mode switching signal f, and the semiconductor switch 63 is on/off-controlled on the basis of the mode switching signal f.

When the operation mode of the transmitter 41B is the low power mode, i.e., when the mode switching signal f is "L", the voltage converter 62 halts its operation. Then, the semiconductor switch 63 turns on and the power-supply voltage Vc is applied to the antenna switch 61. This decreases current consumption to a level lower than when the output voltage Va from the voltage converter 62 is applied to the antenna switch 61. When the operation mode of the transmitter 41B is the normal mode, i.e., when the mode switching signal f is "H", the voltage converter 62 comes into an operating state. Then, the semiconductor switch 63 is off. Accordingly, the output voltage Va from the voltage converter 62 is applied to the antenna switch 61, and the IMD characteristics of the analog switch circuits in the antenna switch 61 are improved.

As described so far, according to the third embodiment, the operation of the voltage converter 62 is halted when the operation mode of the transmitter 41B is judged to be the low power mode, and then the power-supply voltage Vc is applied to the antenna switch 61. On the other hand, the voltage converter 62 operates when the operation mode of the transmitter 41B is judged to be the normal mode, and then the voltage Va is applied to the antenna switch 61. Thus, without the need for the detector 44 for measurement, an appropriate voltage is applied to the antenna switch 61 on the basis of the transmission power of the transmission signal T. This lowers the power consumption while preventing deterioration in the IMD characteristics. This lowers the current consumption in the antenna switch 61. Also, the battery's life is extended and the operating time of the portable radio terminal is lengthened.

While the embodiments of the present invention have been described in detail referring to the drawings, the specific configurations are not limited to those of the embodiments, and modifications and variations of design etc. can be devised without departing from the scope of the invention.

For example, the antenna selector 60 of FIG. 4 may be arbitrarily configured as long as the power-supply voltage Vc or the output voltage Va is selected and applied to the antenna switch 61 on the basis of the voltage converter control signal "c". For example, the semiconductor switch 63 may be composed of an analog switch circuit other than FET. Also, the power supply LSI 80 of FIG. 8 may be arbitrarily configured as long as it converts the transmission power information p to the reference signal "m". Also, in the configuration of FIG. 8, the CPU 71 may realize, with a program, the same function as that of the power supply LSI 80. In this case, the output voltage from the voltage converter 62A is variably controlled using a DAC instead of the power supply LSI 80. Furthermore, the voltage converter 62A of FIG. 8 may be provided with an interface, e.g., a bus function, for communicating with the CPU so that the CPU can directly apply variable control to the output voltage of the voltage converter 62A.

The number of antennas is not limited to two, that is the antennas 51 and 52, but can be any number. For example, three antennas may be provided, one of the three for transmission and the remaining two for reception, and vise versa. Furthermore, while the first embodiment controls the operation of the voltage converter 62 on the basis of a comparison between the transmission power Pout and the threshold A, almost equal functions and effects are obtained when the voltage converter 62 is controlled to operate/halt on the basis of the presence/absence of the transmission signal T.

While the analog switch circuit shown in FIG. 3 uses a P-channel MOSFET, a MOSFET of other type, e.g., an N-channel MOSFET, or a JFET (Junction FET) may be used.

The present invention is applicable not only to mobile phones but also generally to portable radio terminals, such as portable information terminals and transceivers having a plurality of antennas. The present invention is applicable not only to terminals but also to base stations.

What is claimed is:

1. A portable radio terminal, comprising:
    a transmitter that generates a transmission signal;
    a plurality of antennas that radiate a radio wave corresponding to the transmission signal;
    a voltage converter controller; and
    an antenna selector that selects one of the plurality of antennas according to an antenna selection signal,
    the antenna selector comprising:
        a voltage converter that converts a power-supply voltage to a predetermined output voltage higher than the power-supply voltage; and
        an analog switch circuit that operates with the predetermined output voltage from the voltage converter or the power-supply voltage being applied thereto, and
    the voltage converter controller controlling the voltage converter to operate/halt according to a power level of the transmission signal generated by the transmitter, and applying the predetermined output voltage to the analog switch circuit when the voltage converter is operating and applying the power-supply voltage to the analog switch circuit when the voltage converter is halted.

2. A portable radio terminal according to claim 1, wherein the voltage converter controller causes the voltage converter to operate and applies the predetermined output voltage to the analog switch circuit when the transmission signal generated by the transmitter is a transmission power value equal to or greater than a predetermined threshold, and the voltage converter controller causes the voltage converter to halt and applies the power-supply voltage to the analog switch circuit when the transmission power value is smaller than the threshold.

3. A portable radio terminal according to claim 1, wherein the voltage converter controller controls the voltage converter to operate/halt according to presence/absence of the transmission signal generated by the transmitter.

4. A portable radio terminal according to claim 1, wherein the voltage converter controller variably controls the output voltage from the voltage converter according to a transmission power value of the transmission signal generated by the transmitter.

5. An operation control method for a voltage converter used in a portable radio terminal that includes a transmitter that generates a transmission signal, a plurality of antennas that radiate a radio wave corresponding to the transmission signal, and an antenna selector that selects one of the plurality of antennas according to an antenna selection signal, wherein said antenna selector includes a voltage converter that converts a power-supply voltage to a predetermined output voltage higher than the power-supply voltage and an analog switch circuit that operates with the predetermined output voltage from the voltage converter or the power-supply voltage being applied thereto; the method comprising:
    controlling the voltage converter to operate/halt according to a power level of the transmission signal generated by the transmitter; and
    applying the predetermined output voltage to the analog switch circuit when the voltage converter is operating and applying the power-supply voltage to the analog switch circuit when the voltage converter is halted.

6. An operation control method for a voltage converter according to claim 5, wherein the voltage converter is operated to apply the predetermined output voltage to the analog switch circuit when the transmission signal generated by the transmitter is a transmission power value equal to or greater than a predetermined threshold, and the voltage converter is caused to halt to apply the power-supply voltage to the analog switch circuit when the transmission power value is smaller than the threshold.

7. An operation control method for a voltage converter according to claim 5, wherein the voltage converter is controlled to operate/halt according to presence/absence of the transmission signal generated by the transmitter.

8. An operation control method for a voltage converter according to claim 5, wherein the output voltage from the voltage converter is variably controlled according to a transmission power value of the transmission signal generated by the transmitter.

9. A control program product used in a portable radio terminal that includes a transmitter that generates a transmission signal, a plurality of antennas that radiate a radio wave corresponding to the transmission signal; a voltage converter controller; and an antenna selector that selects one of the plurality of antennas according to an antenna selection signal, the antenna selector including a voltage converter that converts a power-supply voltage to a predetermined output voltage higher than the power-supply voltage, and an analog switch circuit that operates with the predetermined output voltage from the voltage converter or the power-supply voltage being applied thereto, the computer program product comprising:

means for causing the voltage converter controller to provide control to cause the voltage converter to operate/halt according to a power level of the transmission signal generated by the transmitter; and means for causing the voltage converter controller to apply the predetermined output voltage to the analog switch circuit when the voltage converter is operating and apply the power-supply voltage to the analog switch circuit when the voltage converter is halted.

10. A control method for selecting one of a plurality of antennas, comprising:

selecting one of said antennas in response to an antenna selection signal; and controlling a voltage level which is applied to a switch for selecting antennas according to a power level of a transmission signal, wherein said controlling is applying a predetermined high voltage to the switch in the case that the power level of the transmission signal is equal to or greater than the predetermined threshold and applying a predetermined low voltage to the switch in the case that the power level of the transmission signal is smaller than the predetermined threshold.

* * * * *